Patented Nov. 21, 1939

2,180,508

UNITED STATES PATENT OFFICE 2,180,508

METHOD AND MATERIAL FOR MARKING LAUNDERED ARTICLES

John L. De Fraine, Brooklyn, and James Y. Smith, Mastic Park, Long Island, N. Y.; said Smith assignor to said De Fraine No Drawing. Application June 20, 1934, Serial No. 731,576

8 Claims. (Cl. 250—81)

The present invention relates to problems connected with laundry processes and more especially to the marking of articles to be laundered. The problem of marking articles which go through laundering processes presents two features, first, a marking that will not deface the finished article; and, secondly, a marking which will be sufficiently permanent to be legible after the article has been submitted to cleansing with the laundry liquids and has been subjected to the heat of drying and ironing.

One of the commonest ways of marking laundry is the use of permanent ink, but this method is objectionable in that it defaces the article marked. Other methods have been devised requiring more or less elaborate grouping and counting methods which do not apply specific marking to each article laundered. These methods are cumbersome in handling large quantities and omit the very desirable features of having an identifying mark on each piece of goods; without individual marking any piece escaping from such a grouping is almost impossible to identify in the laundry.

The present invention overcomes the difficulties of the art by providing a distinguishing mark on each piece of goods, which mark is substantially invisible under normal conditions, but which becomes clearly visible under specifically controlled abnormal conditions. One way in carrying out the present invention is to mark the goods with a marking material that will withstand chemicals, heat and other physical influences to which the goods is subjected and which marking material will be invisible under normal light conditions, but becomes visible under special lighting or radiations.

The preferred way in carrying out the present invention is the provision of a marking liquid, said liquid being adjustable to the correct fluidity for impregnating the goods to make the mark, and being adjustable so as to dry quickly or slowly according to operating requirements, said liquid, after drying to its finished consistency, maintaining stability under the specified chemical and physical influences, and showing no appreciable visibility under normal light, but showing clear visibility under special abnormal conditions, for example, when subjected to a non-hazardous radiation in the invisible ultra-violet region of the spectrum.

The preferred marking fluid comprises a carrier or vehicle and a luminescent pigment. The preferred vehicle is a colorless lacquer or varnish composed of one or more of several suitable colloidal gums or resins dissolved in one or more of several suitable volatile solvents with the optional addition of one or more plasticizers in accordance with desired advantages in lacquer consistency.

Said pigment consists of one or more chemical substances selected for their combined properties of minimum visibility under normal light; maximum luminescence visibility under specially controlled abnormal light or radiation; and optimum characteristics of stability in, and dispersion through, said vehicle.

Certain of the natural and artificial colloids may be used in the carrier. Among such colloids usable for purposes herein accomplished are polymerized styrene and vinyl esters, cumar resins and refined cellulose derivatives.

One vehicle which accomplishes the purposes intended is based on a commercial resinoid known as "Resoglaz" which is a styrene polymer soluble in such volatile substances as turpentine, benzol, toluol, xylol and in ethyl, butyl, and amyl acetates but insoluble in alcohol and acetone. The addition of phthalate, glycollate or phosphate plasticizers contributes to its durability in service as well as improving plasticity. Another styrene polymer known as "Victron" can also be used similarly to "Resoglaz".

Other vehicles accomplishing the purposes intended are based on polymerized vinyl esters. "Mowilith-N", as a resinoid base, consists of polymerized vinyl acetates and is soluble in acetone and mixtures of the benzol series with the organic acetate series, but it does not demand the addition of plasticizers for durability. "Vinylite-C," soluble in the organic acetates, and "Vinyloid-H", soluble in the organic ketones, are chemically stable, but show tendency to slow deterioration under heat and other physical influences. We find certain cellulose derivatives, especially refined grades of nitrocellulose to have very desirable properties of durability when compounded with phthalate and glycollate plasticizers.

Our preferred vehicle, however, is one based on the aforesaid vinyl resinoid, "Mowilith-N", without plasticizer. Our preferred pigment, which is carried by the vehicle and is left fixed in the impregnated mark after the volatile solvents have disappeared, consists of chemical substances whose visual properties approach colorlessness in the vehicle, but which develop sharp luminescence under non-hazardous ultra-violet radiation. We have also found and utilized luminescent substances which have phosphorescent after-glow in order to provide for reading an impregnated mark by after-glow where a marked fabric (such as some artificial silks) develops enough inherent fluorescence to interfere with visibility of the marking pigment during irradiation, the preferred pigments being yellow-green-phosphorescent zinc sulphide and violet-phosphorescent calcium sulphide.

Among the many known fluorescent-luminescent substances which may be used for our purpose are fluorescent organic compounds such as the salicylates, cyclic structures such as anthracene and phenanthrene, nitrogenous cyclic structures such as Novocaine, quinine sulfate, zinc hydroxyquinoline sulfonate and particularly those of cyclic structure similar to phenanthrene such as fluorene and retene; also the fluorescent salts of aluminum, barium, cadmium, calcium, caesium, copper, magnesium, manganese, mercury, nickel, sodium, strontium, zinc and zirconium. Fluorescent substances which show positive coloration in normal light are less desirable in proportion to the strength of such coloration.

The preferred mixture of powdered pigment which accomplishes the purposes intended consists of one part yellow-green luminescent zinc sulfide, one part violet-luminescent fluorene and one part violet-luminescent retene, measured on volume basis. This aggregate of pigment is in turn mixed with ten parts by volume of vehicle and is applied as a liquid to the goods to be marked.

Marking material can be applied to some goods in dry or paste form under pressure, with or without heat, but the preferred form of marking material is a lacquer liquid which dries after application without chemical change in the constituents and which liquid carries the desired pigment. This liquid may be used successfully to make markings directly by a brush of bristles or wires and by a pen or stylus and by brush or spray through a stencil and by a pressure stamp to which the liquid is supplied by saturated stamp pad, or by other mechanical means.

After the marking has been applied and permitted to dry, the articles are ready for the laundry processes. When the laundered articles are to be identified, they are subjected to a light producing a preponderance of ultra-violet rays, with a minimum of the visible spectrum. The pigments above specified are actively excited to luminesce by a band of ultra-violet radiation which is outside of the hazardous zones. Preferably, articles to be laundered are marked in specified places so that the operator may quickly place the specified part of the finished article beneath the source of ultra-violet and thereby make visible the marking without having to search all over the article to find the spot to be inspected.

Where the marking is to be applied to white cloth the material as above specified is the preferred material. Where the marking is to be applied to colored cloth, the marking material if uncolored may be slightly visible in normal light, but this difficulty is overcome by adding a similar color to the marking material, so that in the case of strongly colored fabrics, the minimum visibility under normal light is attained by adding to the marking material a dye or pigment to match the strong color of the fabric.

This character of mark is applicable to any kind of textile cloth without in any way damaging it and without being appreciably visible in normal light. The marking is not destroyed by the usual laundry processes and is capable of functioning fully when laundry processes are finished. The marking is legible under the controlled ultra-violet whether the marked piece is wet or dry and whether clean or soiled to usual degree.

What we claim is:

1. A liquid for marking laundry articles and substantially invisible under ordinary light when applied to articles, comprising a mixture of powdered yellow-green luminescent zinc sulphide, powdered violet phosphorescent calcium sulphide, and a cellulose derivative vehicle to hold said sulphides in place as a mark on textiles during laundering.

2. A liquid material for marking laundry articles and substantially invisible under ordinary light when applied to the articles, comprising a mixture of powdered yellow-green luminescent zinc sulphide, powdered violet phosphorescent calcium sulphide, and a colorless lacquer capable of withstanding laundering processes without substantial deterioration.

3. A material for marking laundry comprising a substantially clear or colorless lacquer as a vehicle, and a luminescent pigment carried by said lacquer, said lacquer and said pigment being substantially inert to heat and chemicals to which said laundry is subjected during laundering operations, and being substantially invisible under ordinary light when applied to laundry articles but visible under ultra-violet rays.

4. A material for marking laundry articles for the purpose of identification comprising a cellulose derivative base dissolved in a suitable solvent, said base being capable of withstanding the action of usual laundering fluids and temperatures, admixed with a luminescent pigment capable of exhibiting a distinctive appearance under predetermined selected rays of artificial light such as ultra-violet, said composition being invisible under ordinary light when applied to white as well as different colored articles.

5. A material for marking laundry articles for the purpose of identification comprising a resinous base including a suitable solvent, admixed with a luminescent substance capable of exhibiting a distinctive appearance under rays of ultra-violet light, said base and said substance being capable of withstanding the action of usual laundering fluids at temperatures up to 175° F. and ironing temperatures within the range of 200° F. to 350° F. when set in the fabric, said material being substantially invisible on the articles under ordinary light.

6. A material for marking laundry articles for the purpose of identification comprising a resinous base including a suitable solvent, admixed with a luminescent substance capable of exhibiting a distinctive appearance under predetermined selected rays of artificial light such as ultra-violet, said base and said substance being capable of withstanding the action of usual laundering fluids at temperatures up to 175° F. and ironing temperatures within the range of 200° F. and 350° F. when set in the fabric, said composition being usable on materials of different colors as well as materials of varied colors, and being substantially invisible on the article under ordinary light.

7. A normally invisible marking material for laundry articles to identify the articles, comprising a resinous base capable of withstanding the action of usual laundering fluids and temperatures throughout a succession of complete laundering operations, admixed with a luminescent pigment which is capable of exhibiting a distinctive appearance only when exposed to and viewed under ultra-violet rays, and said composition being normally invisible on white as well as different colored fabrics in ordinary light.

8. A material for marking laundry articles for the purpose of identification, comprising a resinous base capable of withstanding the action of usual laundering fluids and temperatures throughout a succession of complete laundering operations, admixed with a luminescent pigment which exhibits distinctive color only when exposed to the action of ultra-violet light, said composition being substantially clear in its liquid form and normally invisible under ordinary light when it sets in white as well as different colored fabrics after application thereto as a marking.

JOHN L. DE FRAINE.
JAMES Y. SMITH.